United States Patent
Bunting et al.

(10) Patent No.: US 6,629,843 B1
(45) Date of Patent: Oct. 7, 2003

(54) PERSONALIZED INTERNET ACCESS

(75) Inventors: Kimberley Bunting, Carrolton, TX (US); Kenneth J. Davis, Dallas, TX (US); James Howell, Lewisville, TX (US); Roy Bunting, Carrolton, TX (US)

(73) Assignee: Business Access, LLC, Dallas, TX (US)

( * ) Notice: Subject to any disclaimer, the term of this patent is extended or adjusted under 35 U.S.C. 154(b) by 77 days.

(21) Appl. No.: 09/816,270

(22) Filed: Mar. 22, 2001

Related U.S. Application Data

(60) Provisional application No. 60/191,339, filed on Mar. 22, 2000.

(51) Int. Cl.[7] .............................................. G09B 19/00
(52) U.S. Cl. ........................ 434/118; 434/219; 434/350
(58) Field of Search ................................. 434/118, 350

(56) References Cited

U.S. PATENT DOCUMENTS 6,409,514 B1 * 6/2002 Bull .......................... 434/118
6,418,298 B1 * 7/2002 Sonnenfeld ................. 434/118
6,427,063 B1 * 7/2002 Cook et al. ................. 434/118

* cited by examiner

*Primary Examiner*—Joe H. Cheng
*Assistant Examiner*—John Sotomayor
(74) *Attorney, Agent, or Firm*—William D. McSpadden; John G. Flaim; Baker & McKenzie

(57) ABSTRACT

Present herein is a technique for providing computer and internet access for a group of participants, which can include economically disadvantaged persons. An orientation is first conducted wherein computer technical skills are taught. After the orientation, a computer is provided and installed in the homes of each participant. During installation, the participant is provided with additional training. Internet access is also provided for the participant through a partnership with the local telecommunications provider.

19 Claims, 18 Drawing Sheets

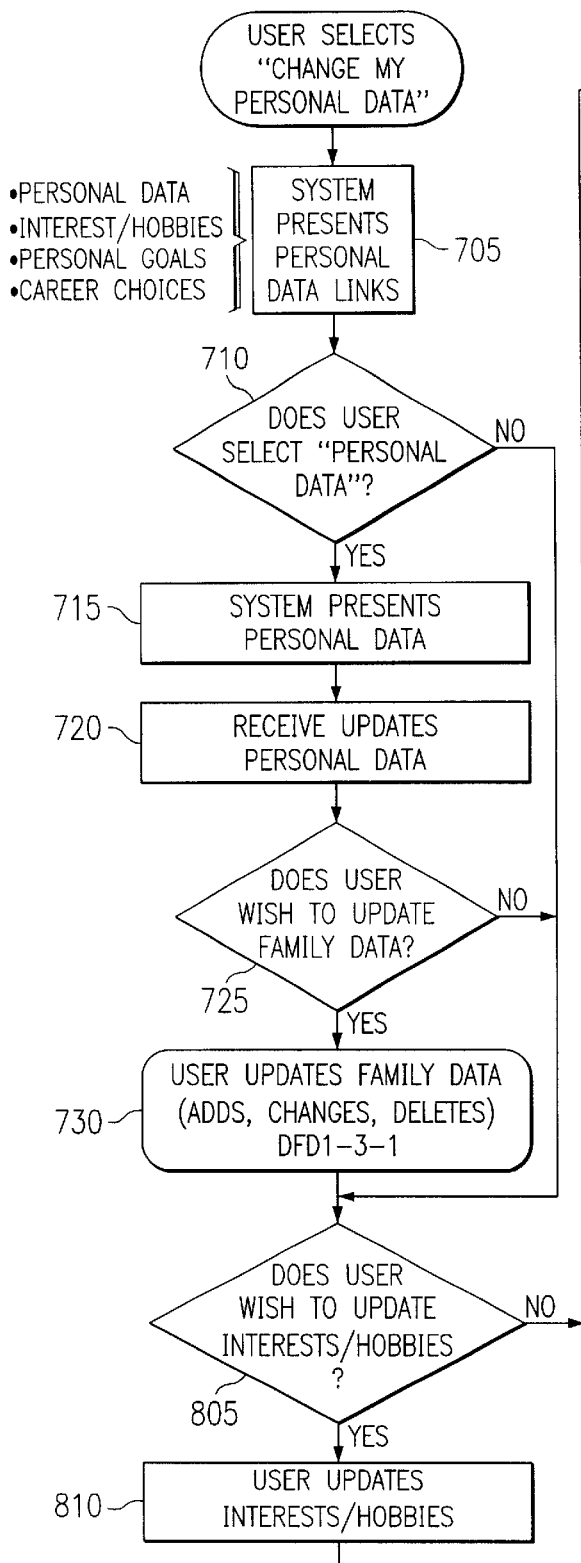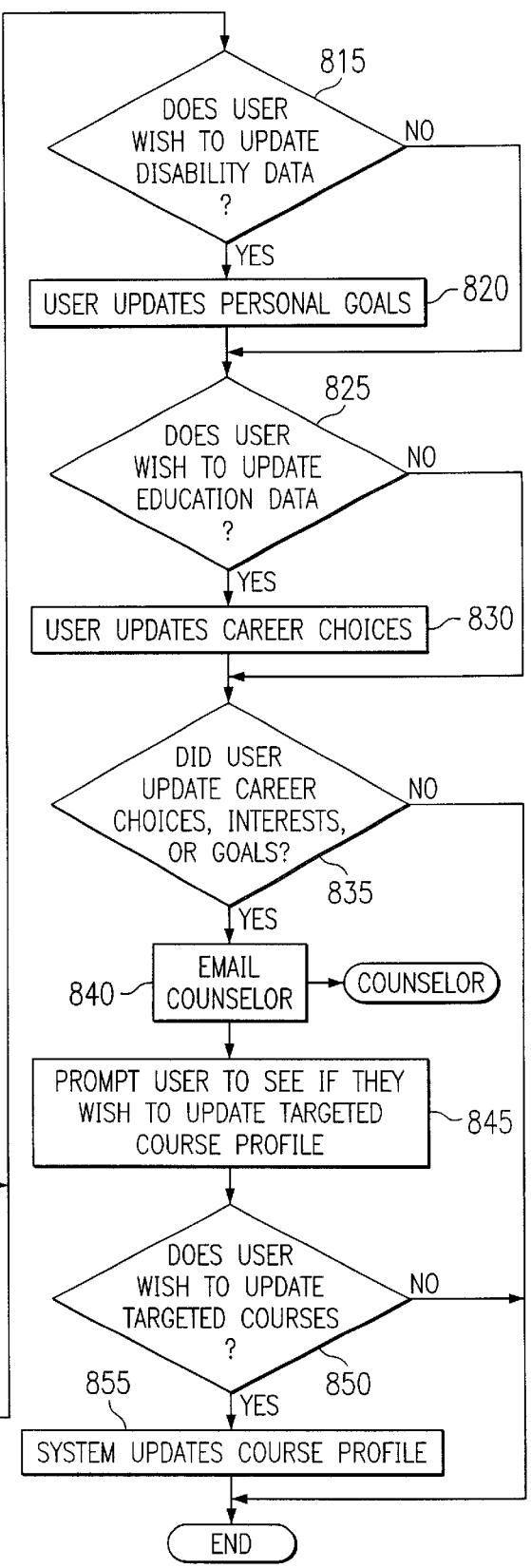
FIG. 6

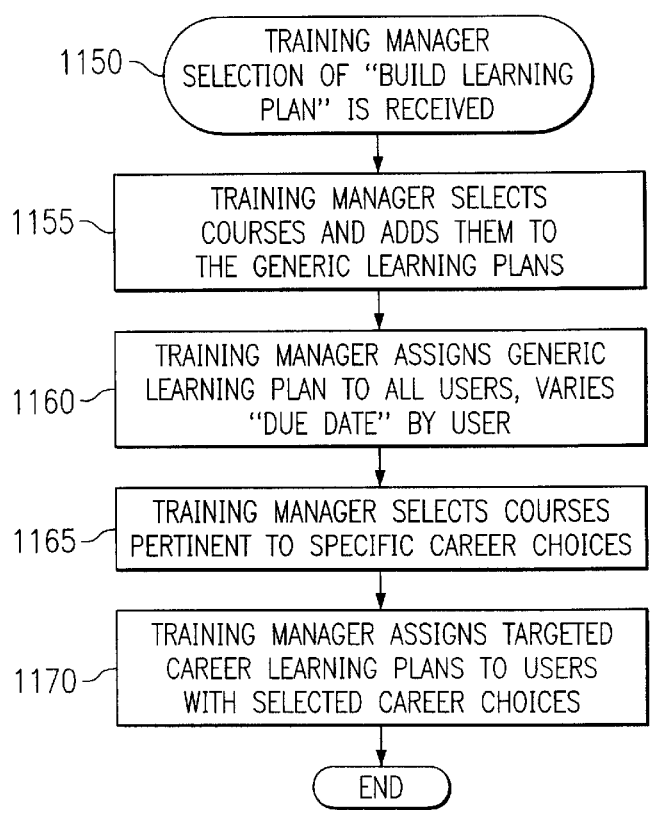
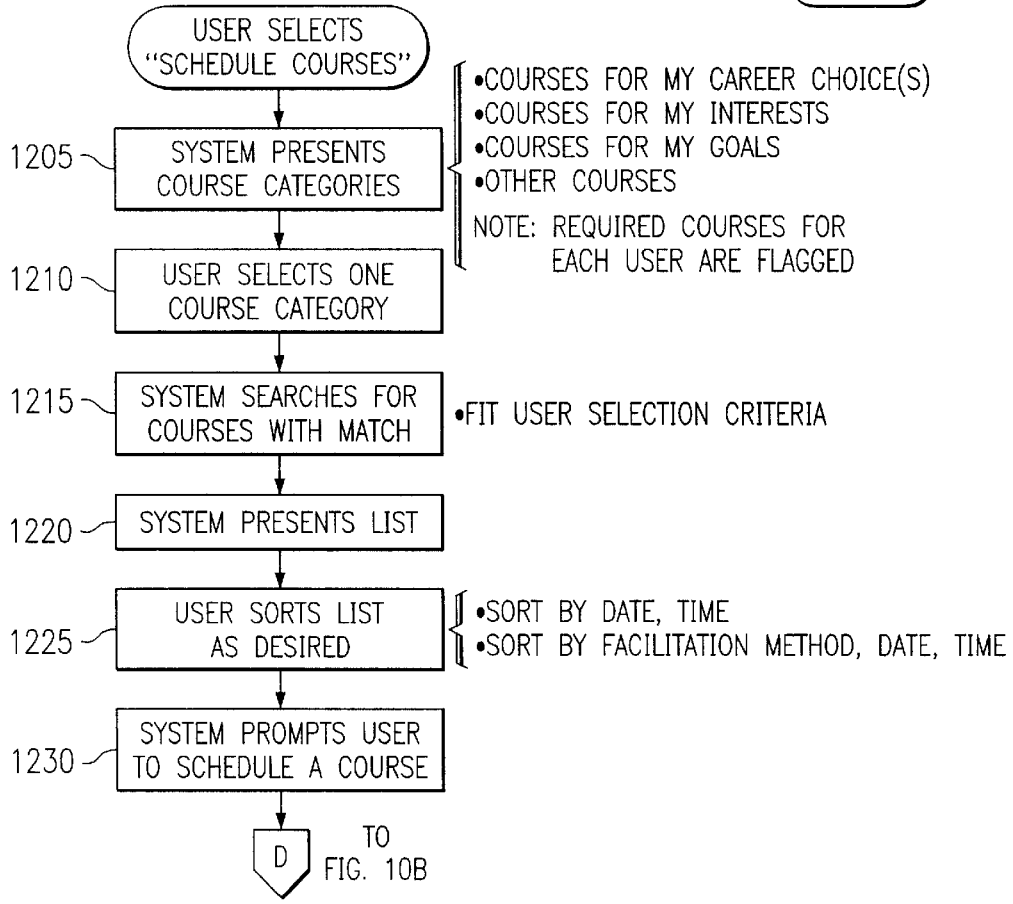

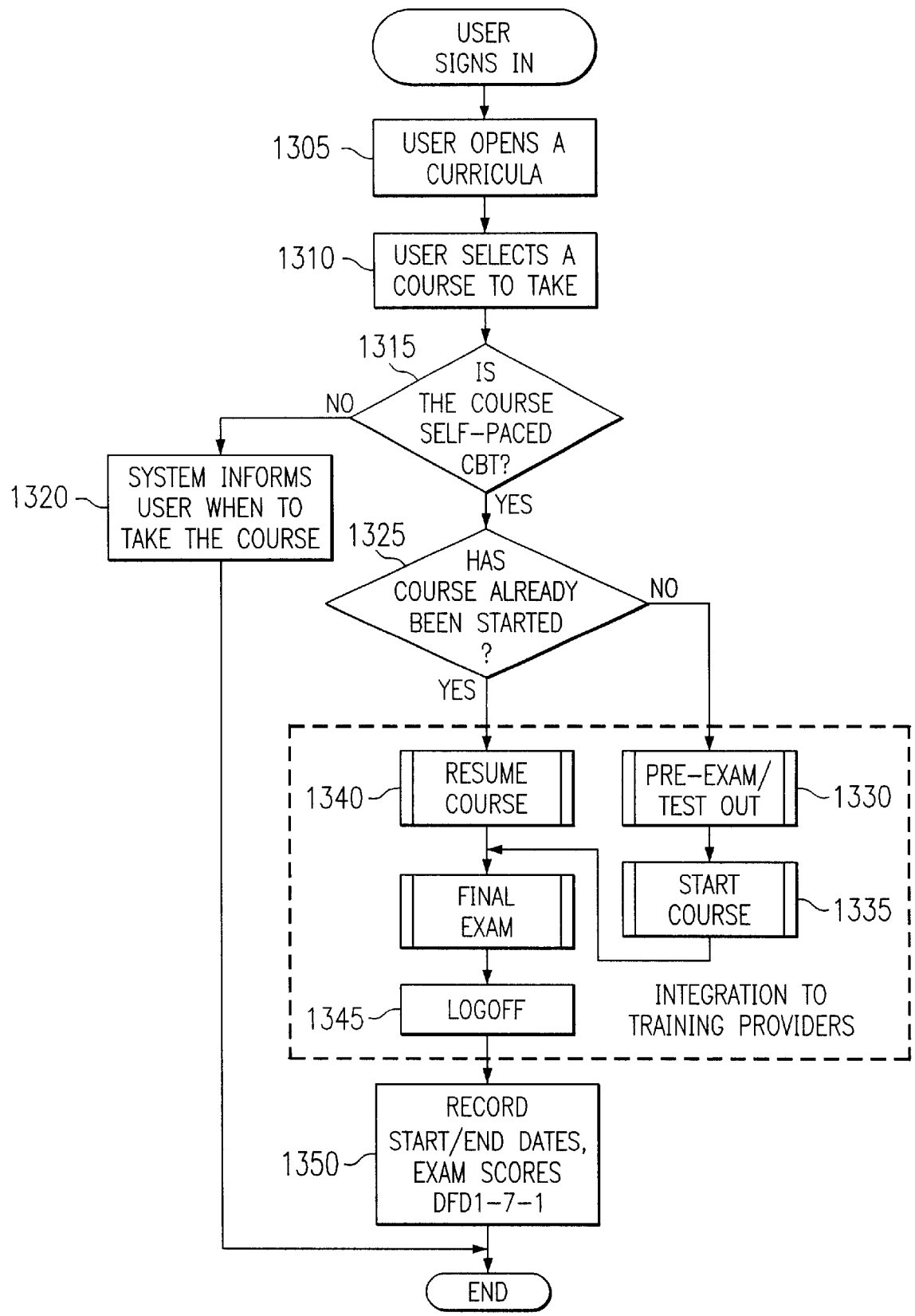

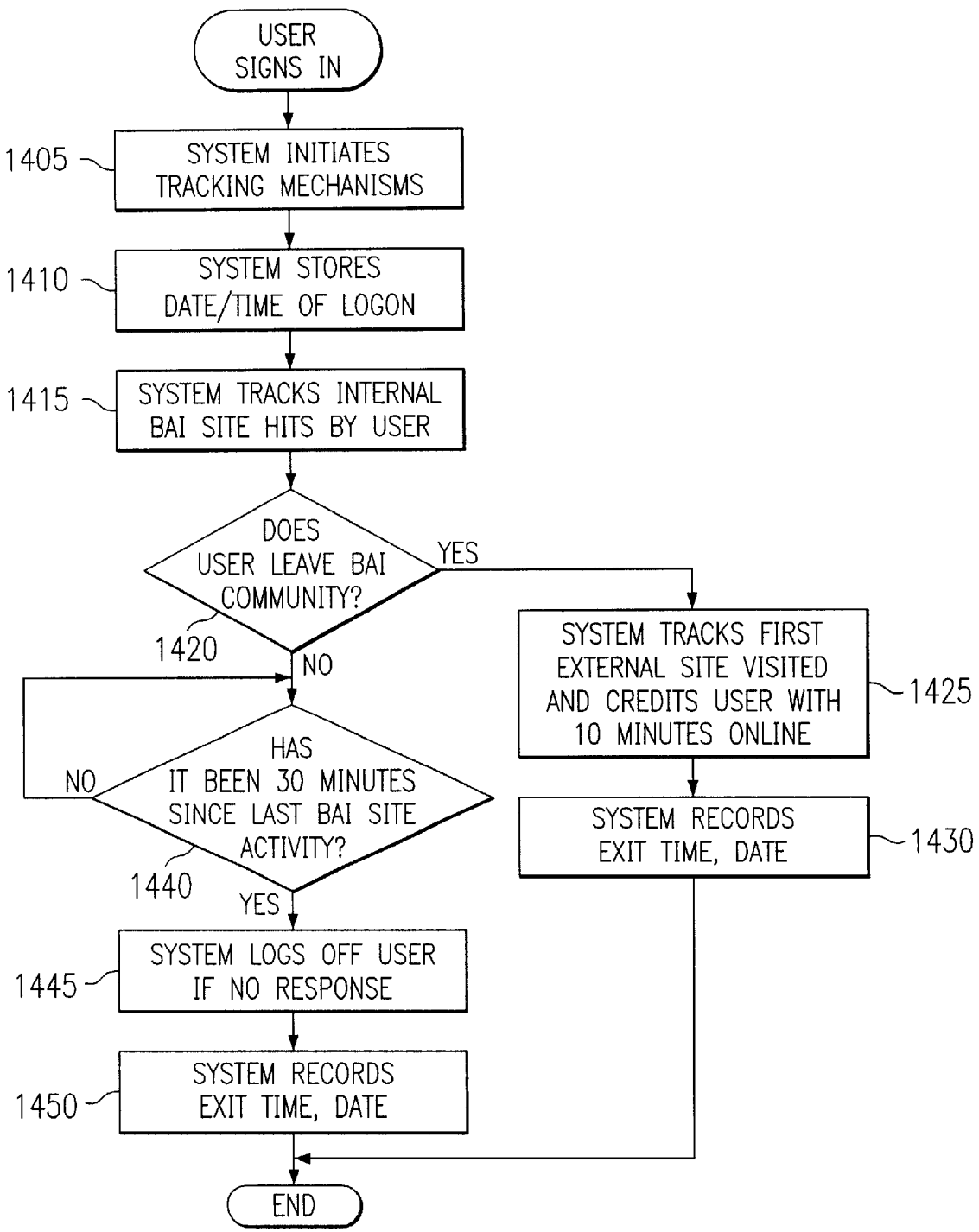

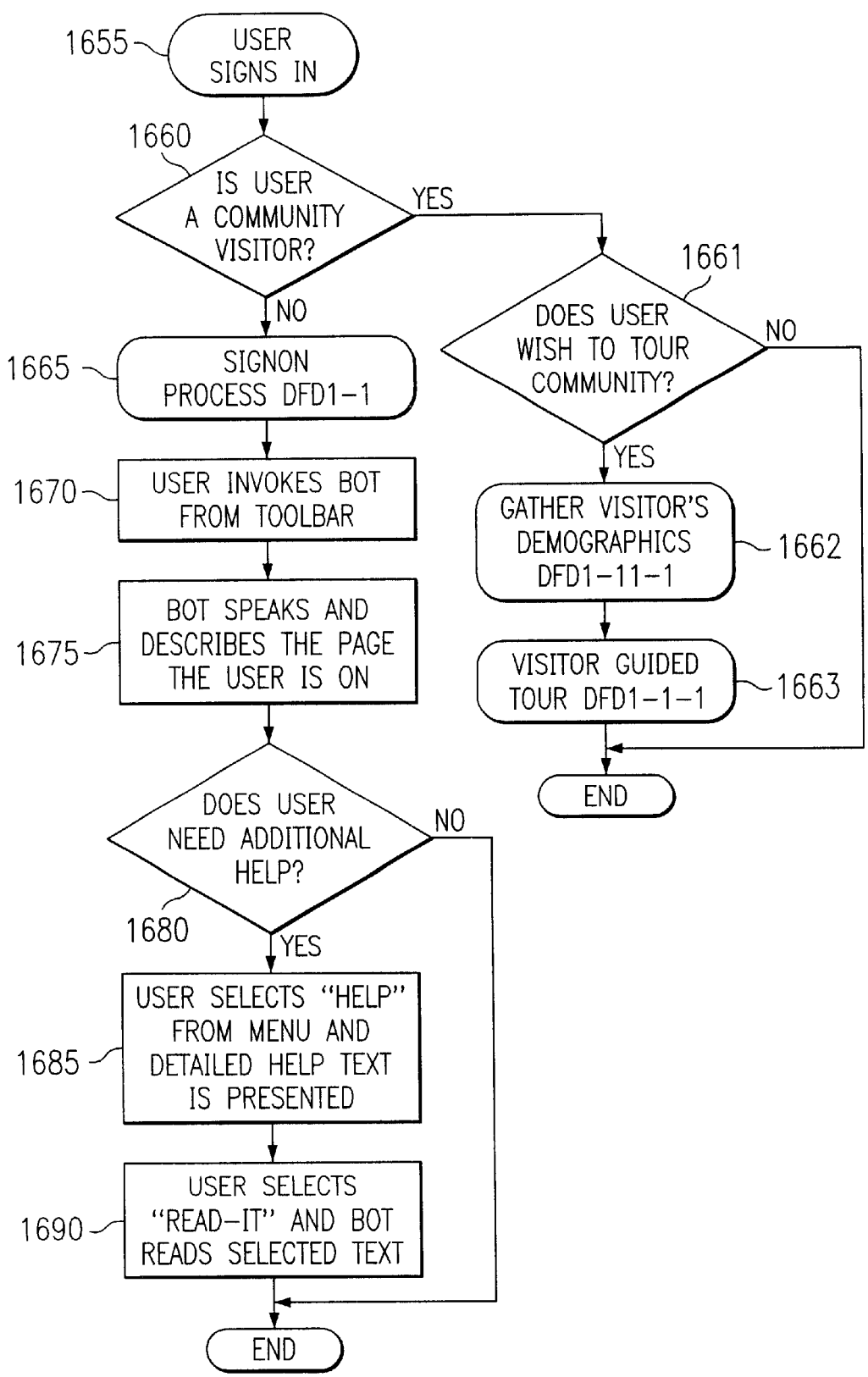

PERSONALIZED INTERNET ACCESS

PRIORITY DATA

This application claims the benefit of "Personalized Internet Access", Provisional Application for Patent, Ser. No. 60/191,339 filed Mar. 22, 2000, by Kimberly Bunting, Kenneth Davis, and James Howell, which is hereby incorporated by reference for all purposes.

TECHNICAL FIELD

The present invention relates to the internet, and more specifically, to improving internet access to a population.

BACKGROUND

America has identified a critical barrier to the advancement of society. Individuals must competently utilize technology to engage in an exponentially increasing number of routine daily activities. Until all citizens have basic technological skills and are connected to the Internet, the United States cannot fully realize the comprehensive modernization and educational advancement afforded by universal connectivity. To truly be connected to the Internet, citizens must have in-home access.

Of those not connected, the 34.5 million Americans (Census, 1998) living below the poverty line represent the greatest challenge. This group faces not only the economical barriers to owning a home computer, but also the barriers of functional and technological literacy required to maintain a personal computer and content customized to the unique situations poverty creates. Accordingly, in addition to the provisioning of computers and internet access, the foregoing group requires technical skills development to effectively use the internet.

SUMMARY

A system, method, and apparatus for creating community networks for the historically disadvantaged is described herein. Through consortiums of local community-based organizations, the resources, issues, and needs of the disadvantaged and their support groups are evaluated o a customized on-line community which meets those needs.

A method for providing internet training and access to persons is presented herein. An orientation and training session is provided initially to the persons which provides internet and computer training. The orientation and training can be provided in partnership with local community based organizations. During the orientation and training session, the persons can be provided tools, such as detailed users' manuals.

Upon completion of the orientation and computer training sessions, computers are installed in the persons' homes. Internet access, either dialup or broadband is arranged in partnership with the local telecommunications providers. During the installation, the computers are programmed to automatically dial and access a predetermined proxy server. Additional computer instruction can also be provided by technicians during the installation.

The predetermined proxy server provides secure access to an internet community which is customized to the user. The proxy server also provides the facility to prevent users from accessing Internet web sites that contain questionable content through the use of filtering software. Once users have logged on and been authenticated by the web site, they have access to a multitude of activities and services provided by the web site software, for example, personalized training curriculums, customized content, featured activities, personal support mechanisms, online mentoring, facilitated communications, and technical support. The web site content is customized to the reading and literacy levels of the users. The activities available on the web site are selected activities which meet the goals of the funding organizations. Additionally, counselors are able to monitor the progress of the users and track their progress.

BRIEF DESCRIPTION OF THE DRAWINGS

FIG. 6 is a flow diagram describing the updating of a personal profile;

FIG. 9 is a flow diagram describing the building of curricula;

FIG. 10A is a flow diagram describing scheduling courses;

FIG. 11 is a flow diagram describing taking courses;

FIG. 13 is a flow diagram describing usage tracking;

FIG. 15 is a flow diagram describing automated help.

DETAILED DESCRIPTION

Figure 1:
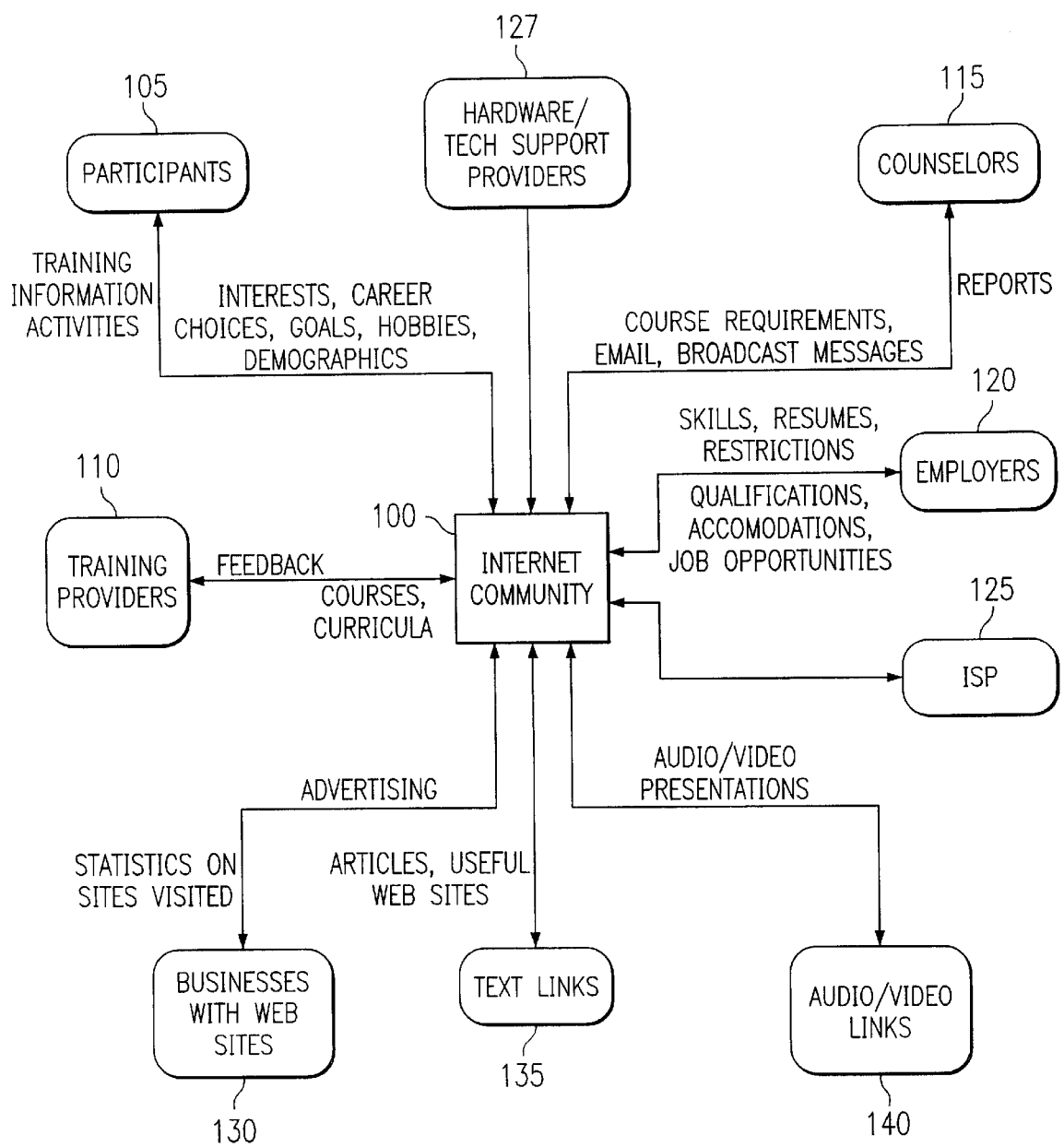
FIG. 1 is conceptual diagram describing an Internet community.

Referring now to FIG. 1, there is illustrated a conceptual diagram describing an internet community 100 for use by any number of participants 105. In addition to the online usage provided by the community 100, Internet service is provided to the participants by a partnership of training providers 110, counselors or fund providers 115, employers 120, and an Internet Service Provider (ISP) 125, and hardware/tech support provides 127.

The participants 105 are the focal point and main users of the internet community and provide information regarding their personal goals, interests, and career choices, and use the community to schedule and participate in self-paced training courses of their choosing. The internet community can target specific courses for each participant 105 based on their specified goals, interests, and career choices, as well as input from counselors.

Each of the participants 105 is generally monitored by counselors or fund providers 115 from a governmental or private organization who support them to ensure they seek gainful employment. The internet community provides useful data regarding which courses participants 105 have enrolled in and how the participants have fared in each course. The internet community also tracks usage time and categorizes usage as may be required by the governmental or private organization. Additionally, the internet community can serve as a conduit for messages from the participants 105 to the counselors 115 and vice-versa.

Access to the internet community is made possible by installation of computers in the participant's homes by Hardware/Tech Support Providers 127. The hardware/tech support providers 127 configure dial-up internet access to the internet community, and provide additional computer instruction and technical support during the installation.

Usage of the internet community resources is facilitated by any number of training providers 110 which offer web-based self-paced training to participants 105 for any number of types of courses. The courses are administered directly over the internet and include pre-placement exams and final exams. Additionally, the internet community provides statistical feedback to the training providers to assist them in fine-tuning their courses and curricula.

External content providers provide content such as web sites 130, text links 135, and audio/visual links 140 to articles and other useful information for the participants. Additionally, the internet community includes a content manager, a customized tool created in a programming language, such as Visual Basic for administration of site content. This tool is utilized to customize and prioritize site content (articles, resources, and related links) and to rotate it on a daily and weekly basis. This tool provides the flexibility to publish specific articles or other content concurrently in one or many specified online communities for selected date ranges. Content is edited and written at a level commensurate with the literacy levels of the participants 105. For participants 105 with low literacy levels or disabilities, the content can be read aloud through the use of animated robots (BOTs).

The internet community administrator coordinates the installation, maintenance, and billing for broadband, or dialup access to the internet community through local telecommunication providers. The internet community trainer(s) 100 conduct orientation sessions for the participants, where the participants are provided detailed instructions on using computers the Internet, and the community web site. Reference materials are included in this orientation. After completion of the orientation session, the internet community administrator 100 coordinates the provisioning of internet access by an Internet Access Provider and installation of a computer into the residence of each participant by the Hardware Tech/Support Provider 127. During installation of the computer, the Hardware Tech/Support Provider 127 provides additional instruction in the usage of the computer, and configures the computer to access the internet community.

Figure 2:
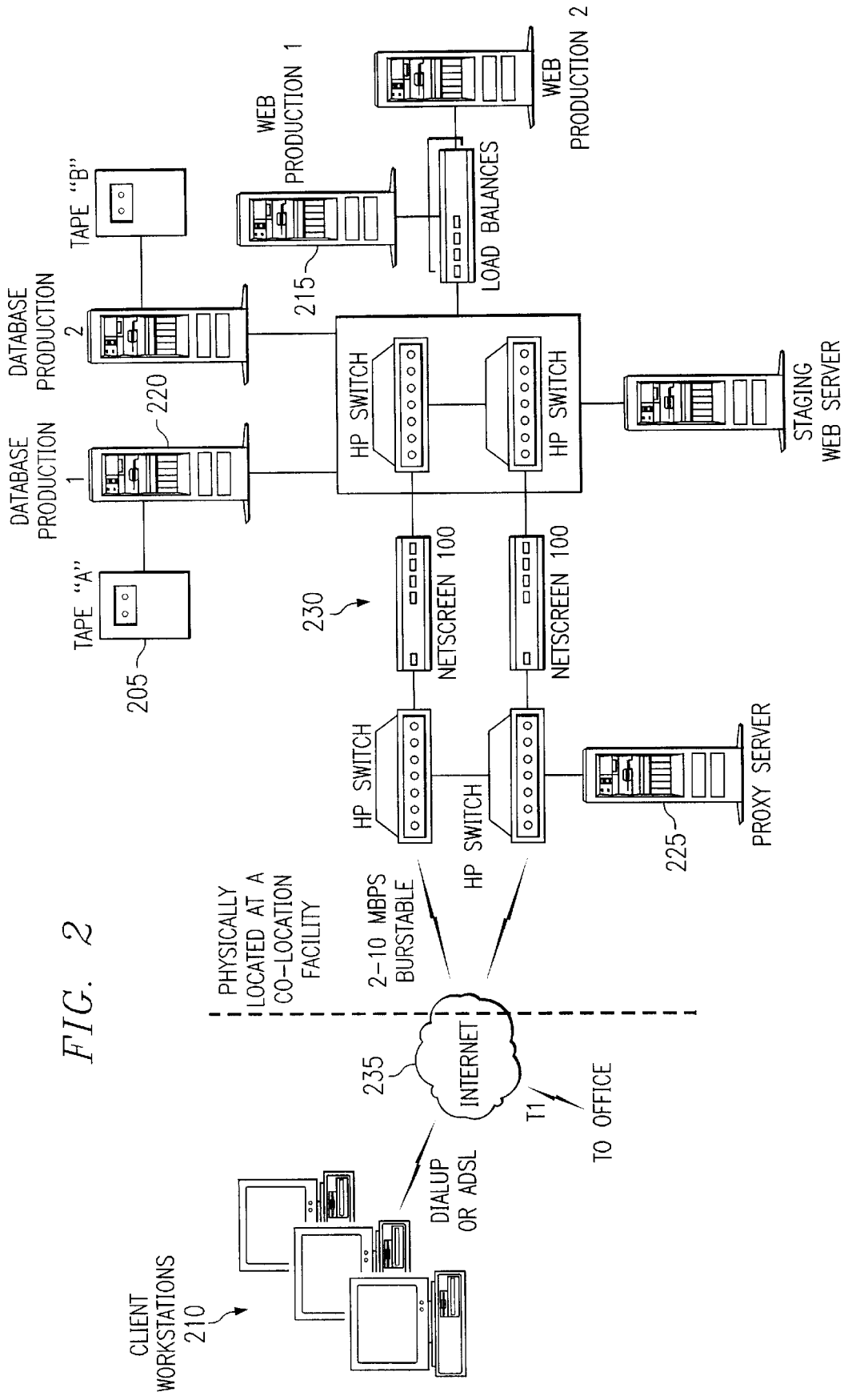
FIG. 2 is a block diagram describing an Internet community.

Referring now to FIG. 2, there is illustrated a block diagram describing the internet community. The internet community includes a private network 205 which is accessible only by client computers of community participants 210. The private network includes web servers 215 for providing web services, database servers 220 for providing access to a database 221, and a proxy server to filter internet content accessed by participants 225.

The private network 205 is accessed via an interface which includes a web server 225 and a firewall 230. The web server 215 provides a graphical user interface which facilitates use of the private network 205 resources. The client computer 210 accesses the web server 215 by establishing a communication channel over a communication medium such as the internet 235. Upon accessing the web server 215, the graphical user interface is displayed at the client computer 210.

Figure 3:
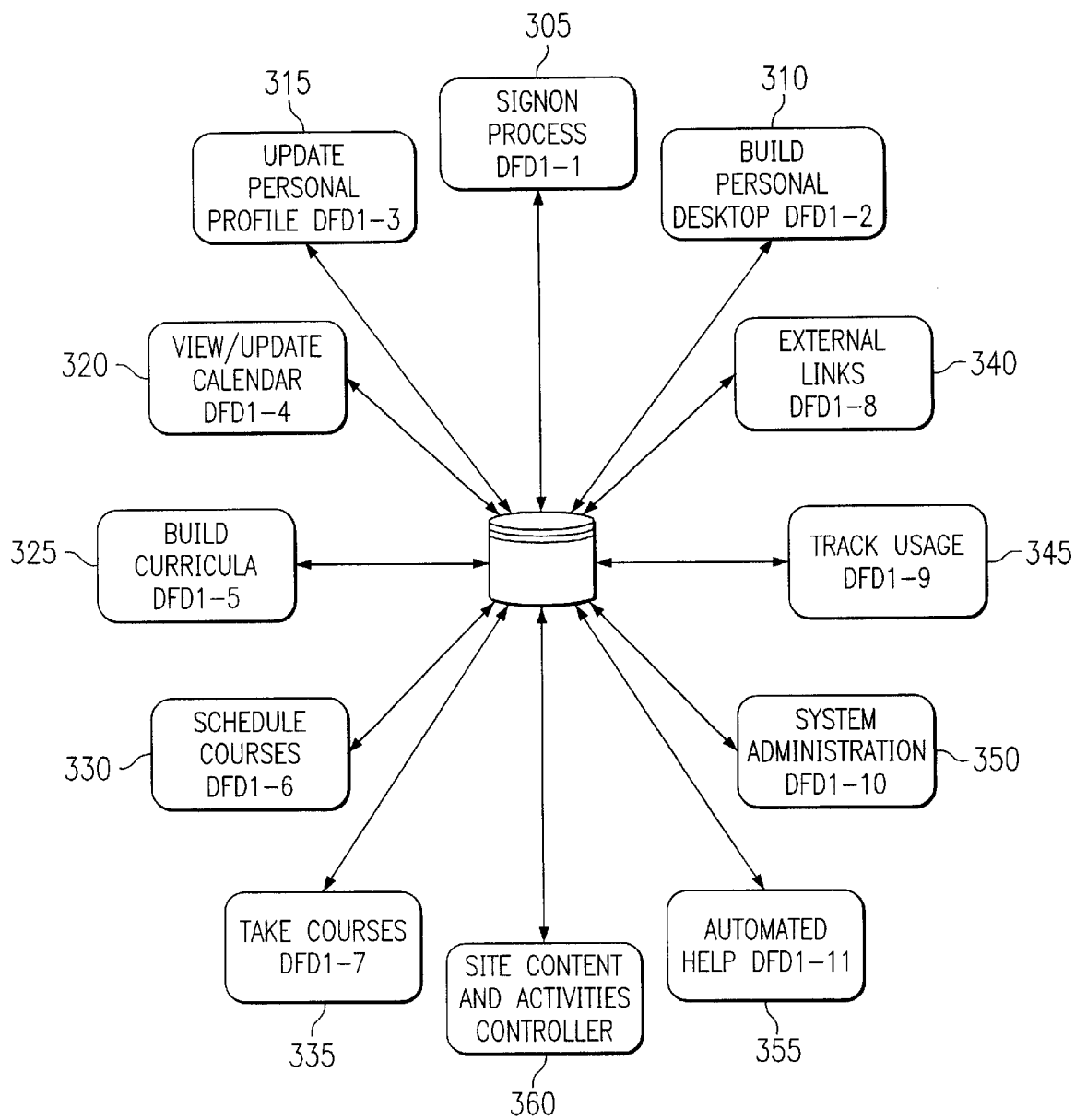
FIG. 3 is block diagram of processes which are available from the Internet community.

Referring now to FIG. 3, there is illustrated a block diagram of the various processes which are accessible at the private network 205. The processes include a signon process 305 for accessing the private network 205, a build personal desktop process 310 for customizing the desktop on the client computer 210, a process for updating the personal profile 315 stored at the database 221, a calendar process 320 for viewing and updating a calendar, a process for building the curricula of courses 325, a course scheduler 330, an interface for taking courses online 335, external links 340, a process for tracking usage 345, a system administration process 350, an automated help process 355, and a site content and activities process 360.

Figure 4:
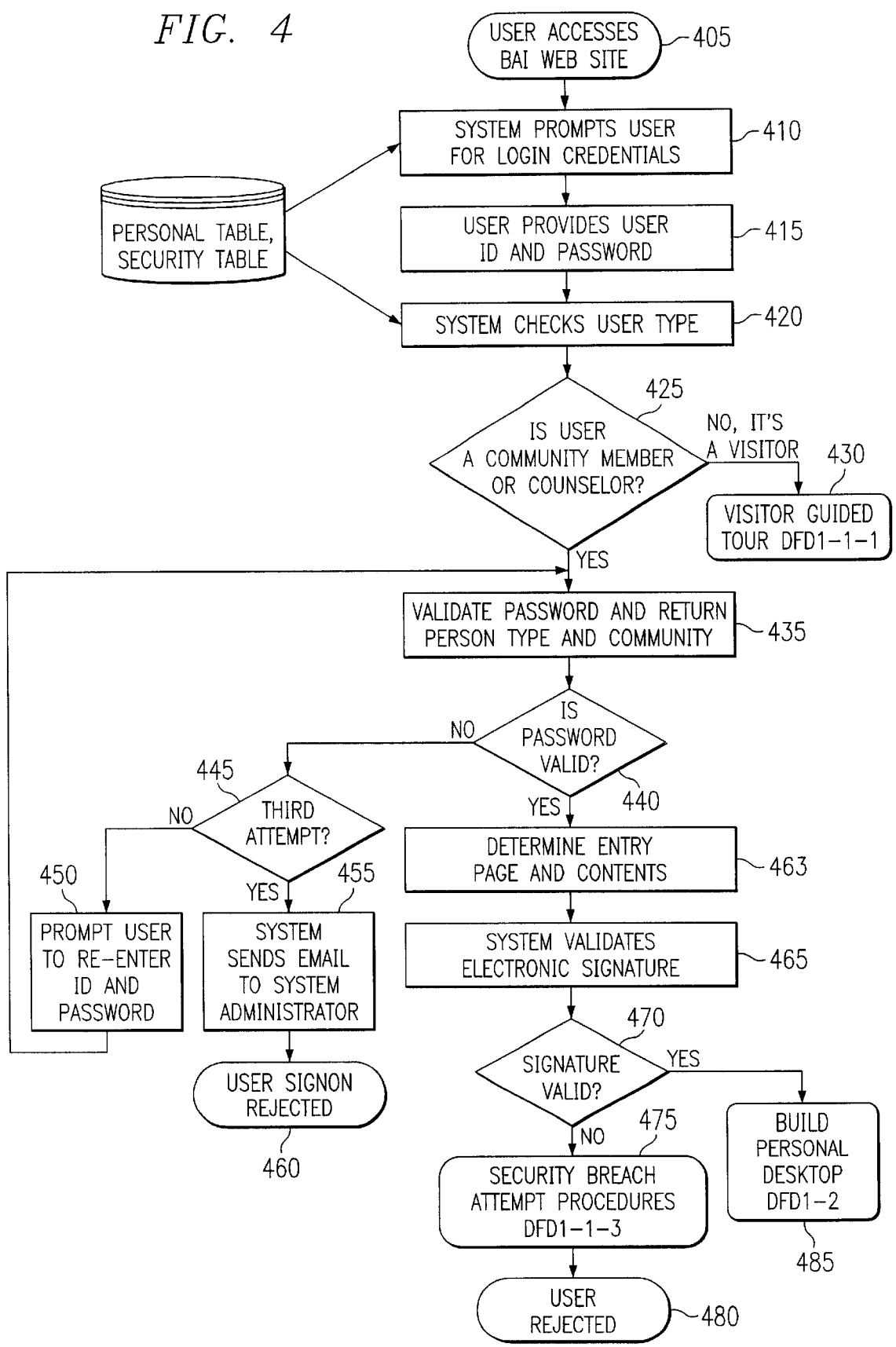
FIG. 4 is a flow diagram describing the sign on process.

Referring now to FIG. 4, there is a flow diagram describing the signon process. At step 405, a client/server connection between the client computer and the server computer is established. Responsive thereto, the computer system prompts the user for a userid and password (step 410). Responsive thereto, the user provides the userid and password (step 415). At step 420, the computer system checks the userid in the database 221.

The database 221 indicates whether the userid is associated with a community member, a counselor, or a system administrator. Wherein the userid is not in the database 221, the userid is associated with a guest. At step 425, a determination is made whether the userid is associated with a guest. Wherein the userid is associated with a guest, the user is permitted to take a guided visitor tour (step 430) but is not permitted access to the web site.

Wherein the userid is associated with a member or counselor, the system attempts to validate the password (step 435) and return the person type and community. At step 440, the system determines if the password is valid. Wherein the password is not valid during step 440, the user is prompted to reenter the password (step 450), unless the failed password validation during step 435 was a third consecutive failure (step 445), wherein the system sends a message to the system administrator (step 455) and user sign on is rejected (step 460).

Wherein the password is validated during step 435 the system uses the person type and ID to determine what entry page (participant or counselor), and contents are displayed (step 463). Once the password is validated during step 435, the personal desktop for the user is build (step 485). However, in another embodiment may use an additional security measure, known an electronic certificate. At step 465, the system attempts to validate an electronic certificate. Wherein the electronic signature is invalid during step 470, security breach attempt procedures are executed (step 475) and the user is rejected (step 480). Where the signature is valid during step 470, the personal desktop for the user is built (step 485).

Figure 5A:
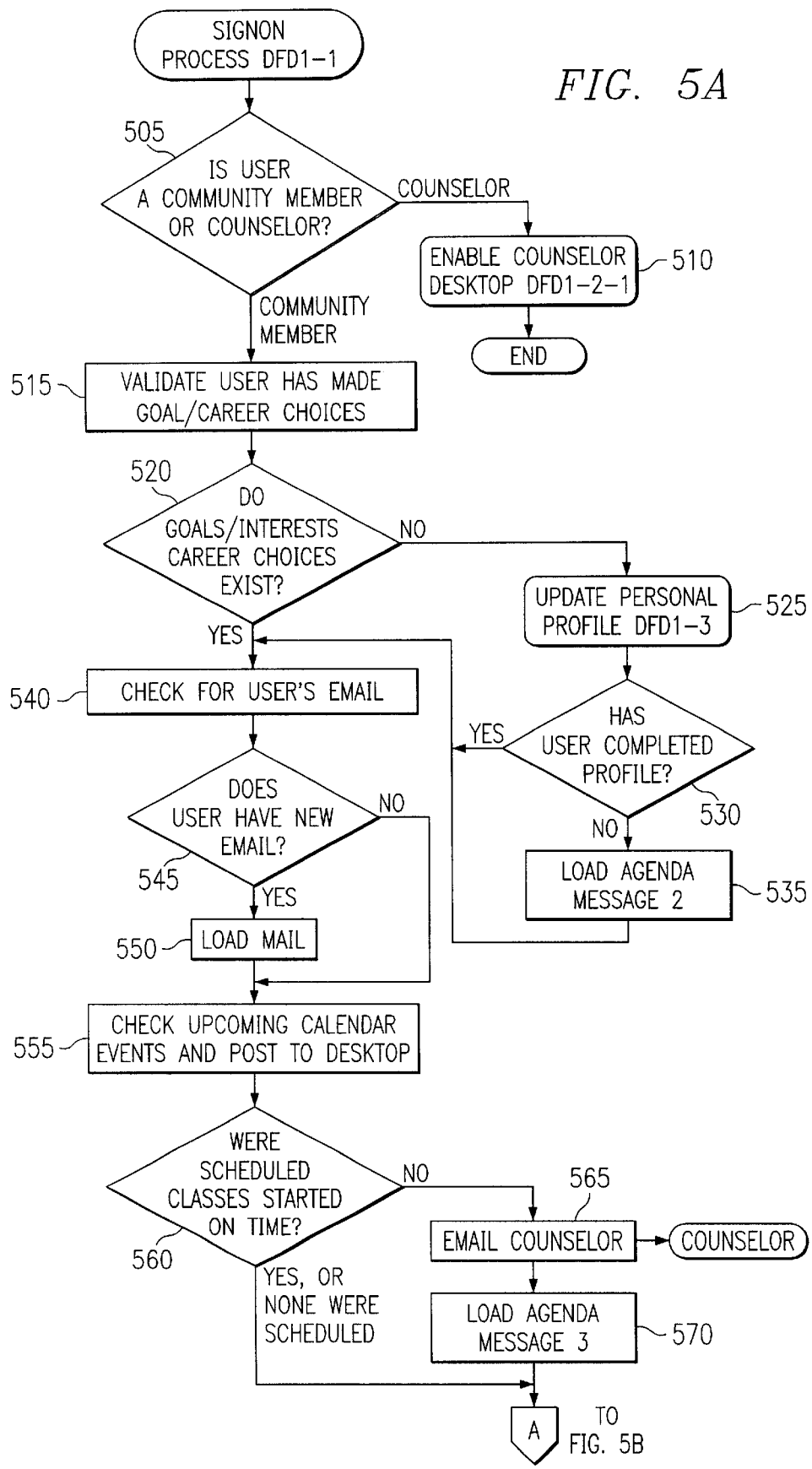
FIG. 5A is a flow diagram describing the building of a personal desktop.
Figure 5B:
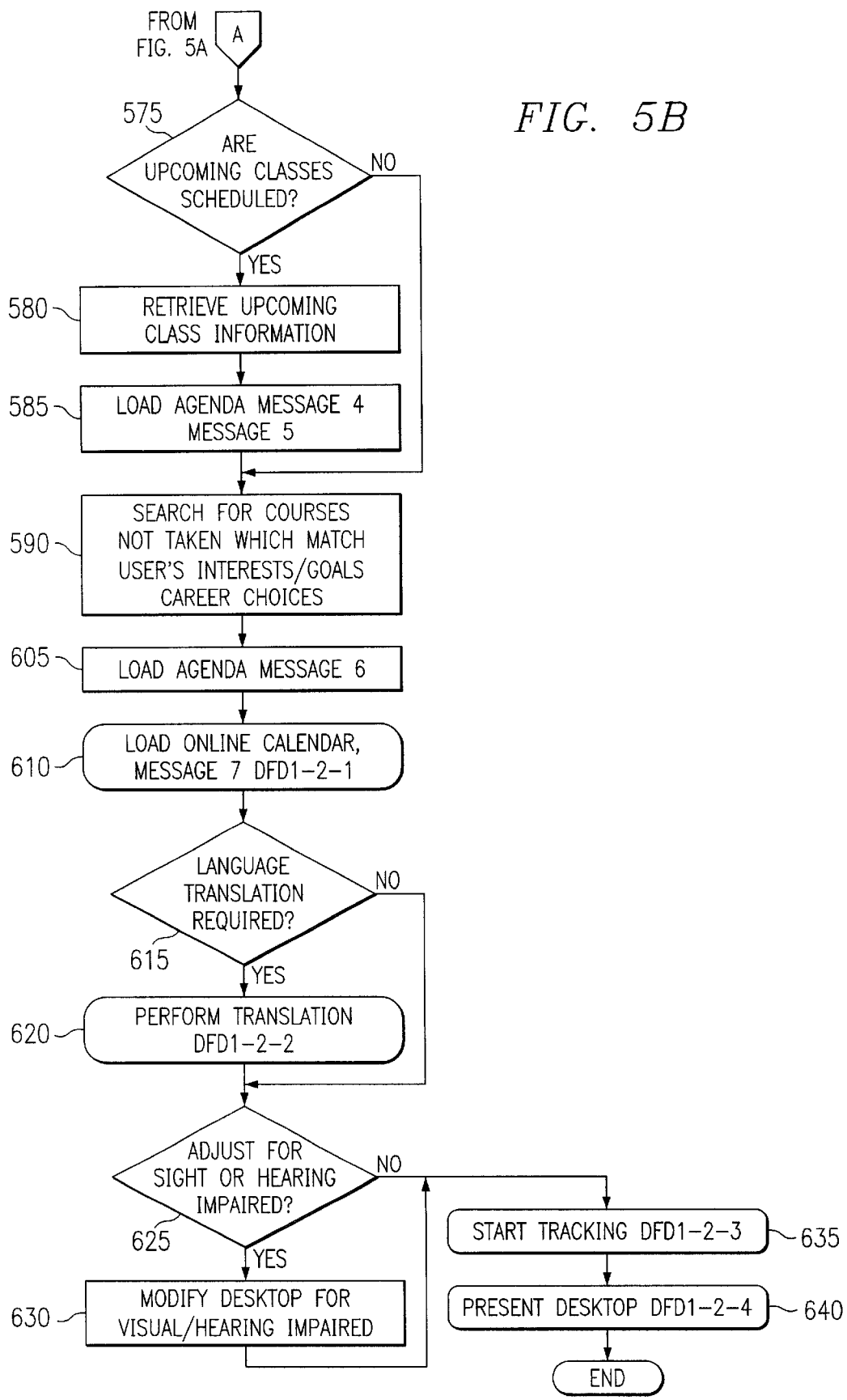
FIG. 5B is a flow diagram describing the building of a personal desktop.

Referring now to FIG. 5A, there is illustrated a flow diagram describing the building of the personalized desktop. After completion of the signon process describing in FIG. 4, at step 505, a determination is made whether the userid is associated with a member or a counselor. Wherein the userid is associated with a counselor, a desktop with applicable messages for a counselor is built (step 510). In one embodiment, an icon can be displayed and the process proceeds to step 540. In another embodiment, where the userid is associated with a user during step 505, a validation is made whether the user has made goal and career choices (step 515). Wherein goal and career choices are found not to exist during step 520, the user's personal profile is updated (step 525). After the procedure for updating the profile is performed, a determination is made whether the user has completed their profile (step 530). Wherein the user has not completed their profile during step 530, the reminder message is loaded to the desktop (step 535). Wherein the user has completed their profile during step 530, step 535 is bypassed.

During step 540, the user's email is checked, and wherein the user has email during step 545, a message indicating the same is loaded to the desktop (step 550). Wherein the user does not have email, step 550 is bypassed. At step 555, a check is made for upcoming calendar events, which are subsequently posted to the desktop as reminders for the user. During step 560, a determination is made whether the user needs assistance with their training and then process proceeds to step 610. In another embodiment, a determination can be made whether the user attended each of the classes on time (step 560). Wherein the user has not attended a class on time, a message, such as an email, is generated and sent to the user's counselor (step 565) and a message indicating that a class was missed is loaded to the desktop (step 570). Wherein the user has attended each of the scheduled classes on time, or wherein no classes were scheduled, steps 565, and 570 are bypassed.

At step 575, a determination is made whether upcoming classes are scheduled. Wherein upcoming classes are scheduled during step 575, the upcoming class information is retrieved during step 580 from the database 221 and messages indicating the upcoming messages are loaded to the desktop (step 585). Wherein no upcoming classes are scheduled during step 575, steps 580 and 585 are bypassed.

During step 590, a search is made in the database 221 for classes which the user has not taken which match the user's interests, goals, and career choices. Referring now to FIG. 6, at step 605, messages indicating the courses which match the user's interests, goals, and career choices are loaded to the desktop.

At step 610, an online calendar is loaded to the desktop. At step 615, a determination is made whether a language translation is required by examining records in the database 221. Wherein a language translation is required, the content of the desktop is translated to the user's language (step 620). Wherein a language translation is not required, step 620 is bypassed.

In one embodiment, adjustments can be made for the visually or hearing impaired. At step 625, a determination is made whether adjustments are required for the visually or hearing impaired by examination of the database 221. Wherein adjustments are required during step 625, appropriate adjustments are made for the user (step 630). Step 630 is bypassed wherein no adjustments are required for visual or hearing impairments.

At step 635, the user's use of the internet community is tracked, calculated, stored in the database 221 and reported on the desktop and at step 640, the desktop is presented on the user's computer, thereby terminating the process.

Figure 7:
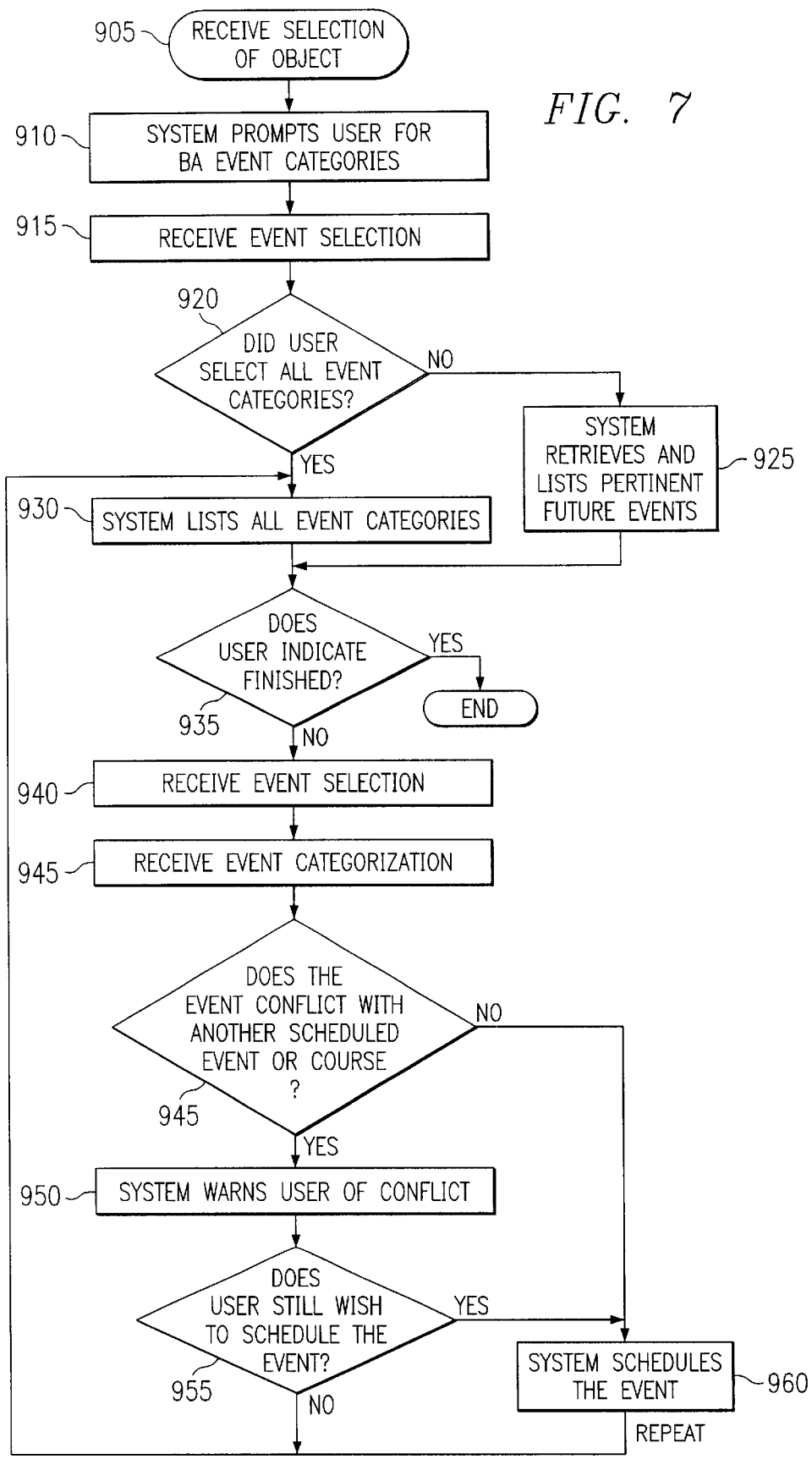
FIG. 7 is a flow diagram describing the updating of the calendar.

Referring now to FIG. 7, there is illustrated a flow diagram describing the updating of the personal profile. At step 705, the system retrieves the data from the database 221 and presents the personal data links which permit the user to change information, including personal data, family data, interests/hobbies data, personal goals data, disability data, education data, and career choices data.

At step 710, a determination is made whether the user chose to change their personal data. Wherein the user has chosen to change their personal data during step 710, the system presents the users personal data from the database 221 (step 715) and receives the updates to the personal data and stores the updates in the database 221 (step 720). Wherein the user does not choose to change their personal data, steps 715 and 720 are bypassed.

At step 725, a determination is made whether the user chose to change their family data. Wherein the user has chosen to change their family data during step 725, the system receives updates and edits to the family data and stores the foregoing in the database 221 (step 730). Wherein the user has not chosen to change their family data, steps 725 and 730 are bypassed.

Figure 8A:
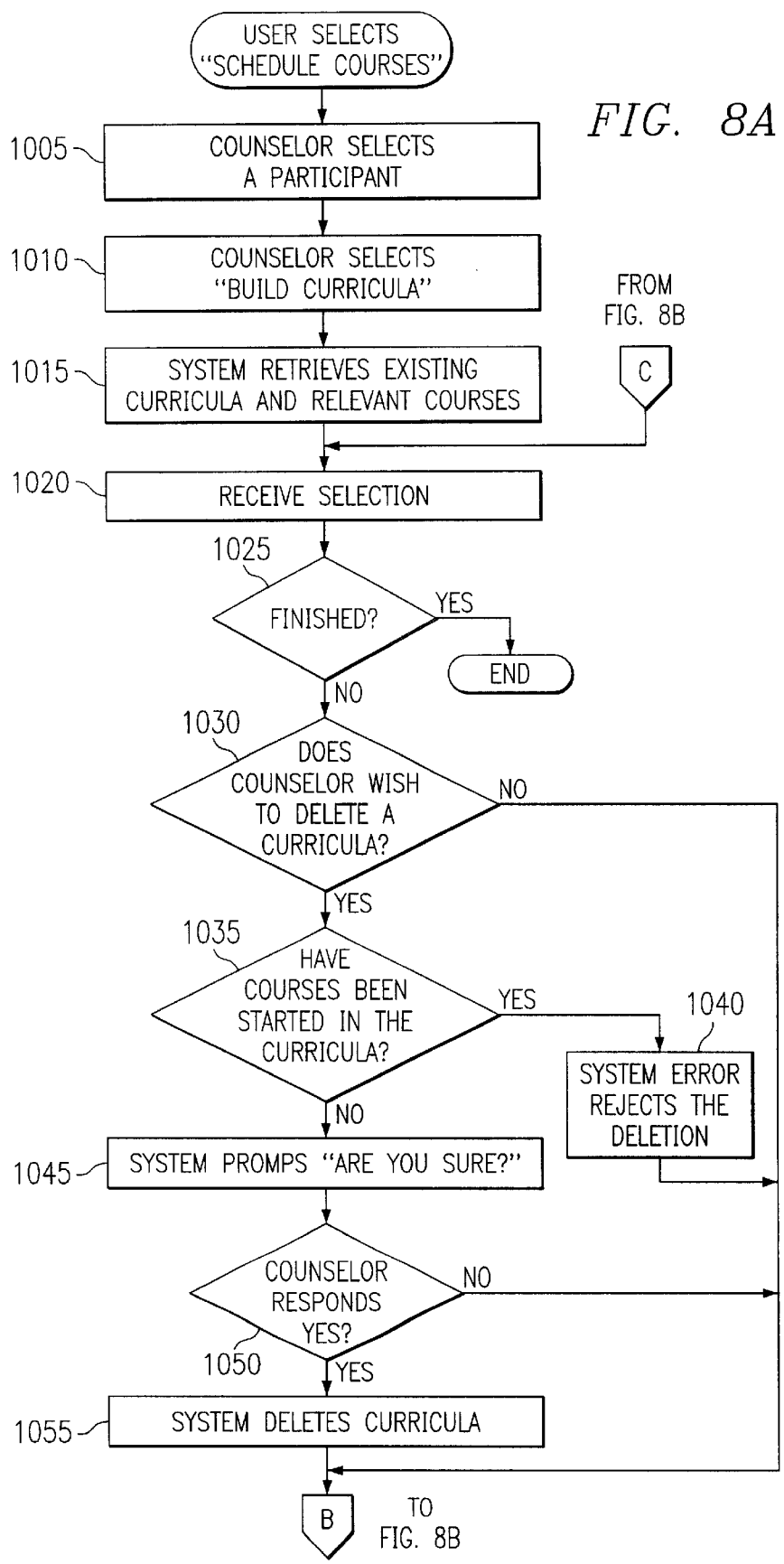
FIG. 8A is a flow diagram describing the building of curricula.
Figure 8B:
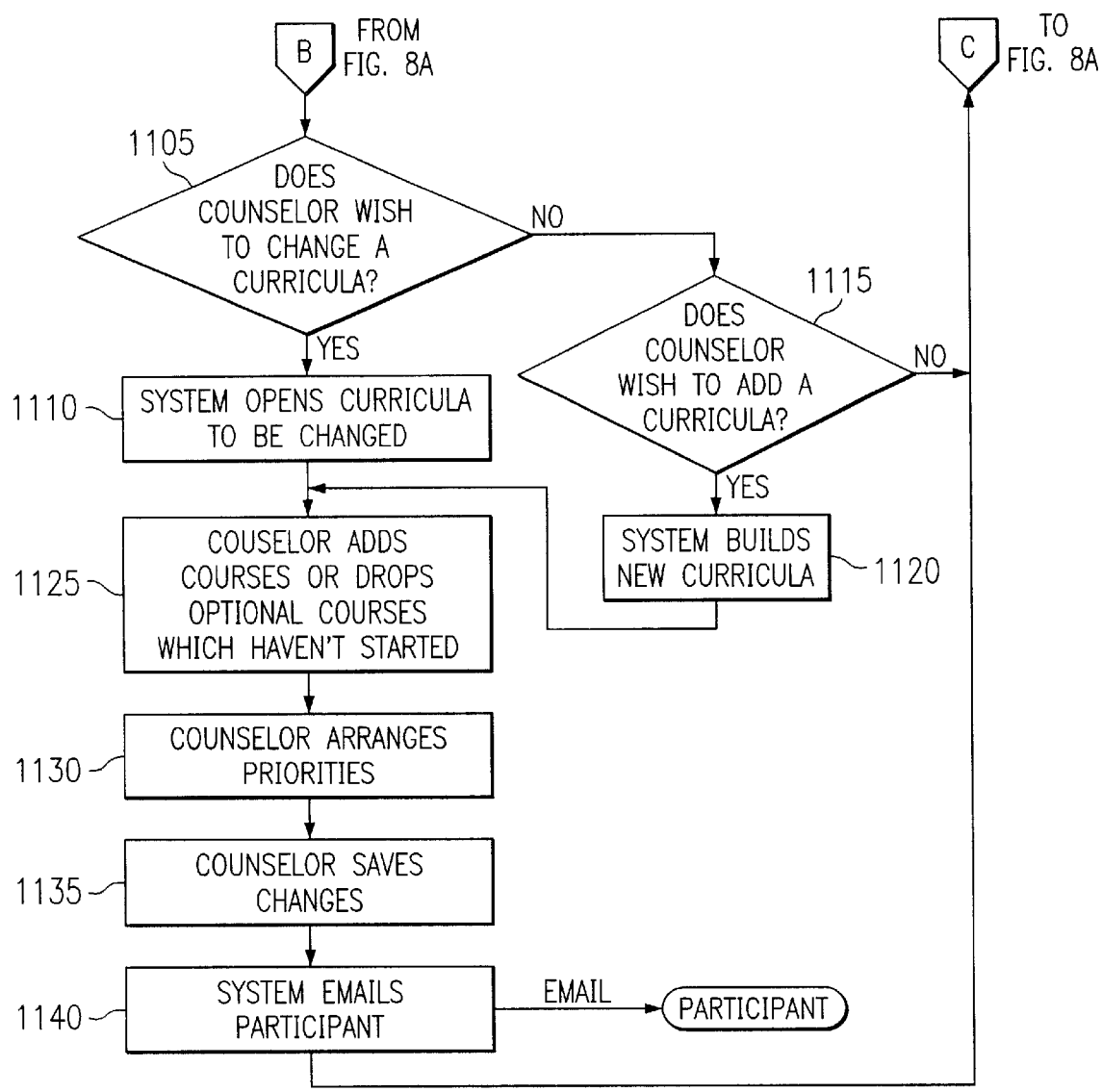
FIG. 8B is a flow diagram describing the building of curricula.

Referring now to FIG. 8, at step 805, a determination is made whether the user chose to change their interests/hobbies data. Wherein the user has chosen to change their interests/hobbies data during step 805, the system receives updates and edits to the interests/hobbies data and stores the foregoing in the database 221 (step 810). Wherein the user has not chosen to change their interests/hobbies, steps 805 and 810 are bypassed.

At step 815, a determination is made whether the user chose to change their disability data. Wherein the user has chosen to change their disability data during step 815, the system receives updates and edits to the disability data and stores the foregoing in the database 221 (step 820). Wherein the user has not chosen to change their disability data, steps 815 and 820 are bypassed.

At step 825, a determination is made whether the user chose to change their education data. Wherein the user has chosen to change their education data during step 825, the system receives updates and edits to the education data and stores the foregoing in the database 221 (step 830). Wherein the user has not chosen to change their education data, steps 825 and 830 are bypassed.

At step 835, a determination is made whether the user made any changes to career choices data, interests/hobbies data, or personal goals data. In one embodiment, wherein a change was made, an message (such as an email) is sent to the user's counselor (step 840) and the user is prompted (step 845) to determine if they wish to update the targeted course profile (step 850) and the updating of the user profile is complete. Wherein the user wishes to update their targeted courses, the system receives the updates and stores the updates in the database 221 (step 855). Wherein the user chooses not to update the course profile, step 855 is bypassed, and the updating of the user profile is complete. Wherein the user has not made a change to career choices data, interests/hobbies data, or personal goals data, steps 840–855 are bypassed and the updating of the user profile is complete.

Referring now to FIG. 9, there is illustrated a flow diagram describing the addition of events to the user's calendar. Responsive to receiving a selection of a calendar object (step 905), the personal calendar inherits events from a system calendar which are displayed, along with personal events and the user is prompted for event categories (step 910). At step 915, an event selection is received. The event selection can either comprise an event category or all of the event categories. At step 920, a determination is made whether the user has selected all of the event categories.

Wherein the user has selected a particular event category, pertinent future events are retrieved from the database 221 and listed (step 925). Wherein the user has selected all of the event categories, all of the event categories are listed (step 930).

At step 935, a determination is made whether the user has indicated that they have finished selecting events. Wherein the user has not finished selecting events, an event selection is received at step 940. Responsive thereto, a determination is made whether the event selection conflicts with another scheduled event or course by retrieving the foregoing information from the database 221 (step 945). Wherein no conflict exists, the event is scheduled in the calendar (step 960).

Wherein a conflict exists, the user is warned about the conflict (step 950) and asked whether they wish to still schedule the event (step 955). Wherein the user indicates that they still wish to schedule the event, the event is scheduled in the calendar (step 960). Wherein the user does not wish to schedule the event, step 960 is bypassed.

Steps 930–960 are then repeated until the user indicates that they have completed scheduling events during step 935. When the user indicates that they are finished scheduling events during step 935, the user exits the calendar (step 965) and the calendar scheduling is completed.

Figure 10B:
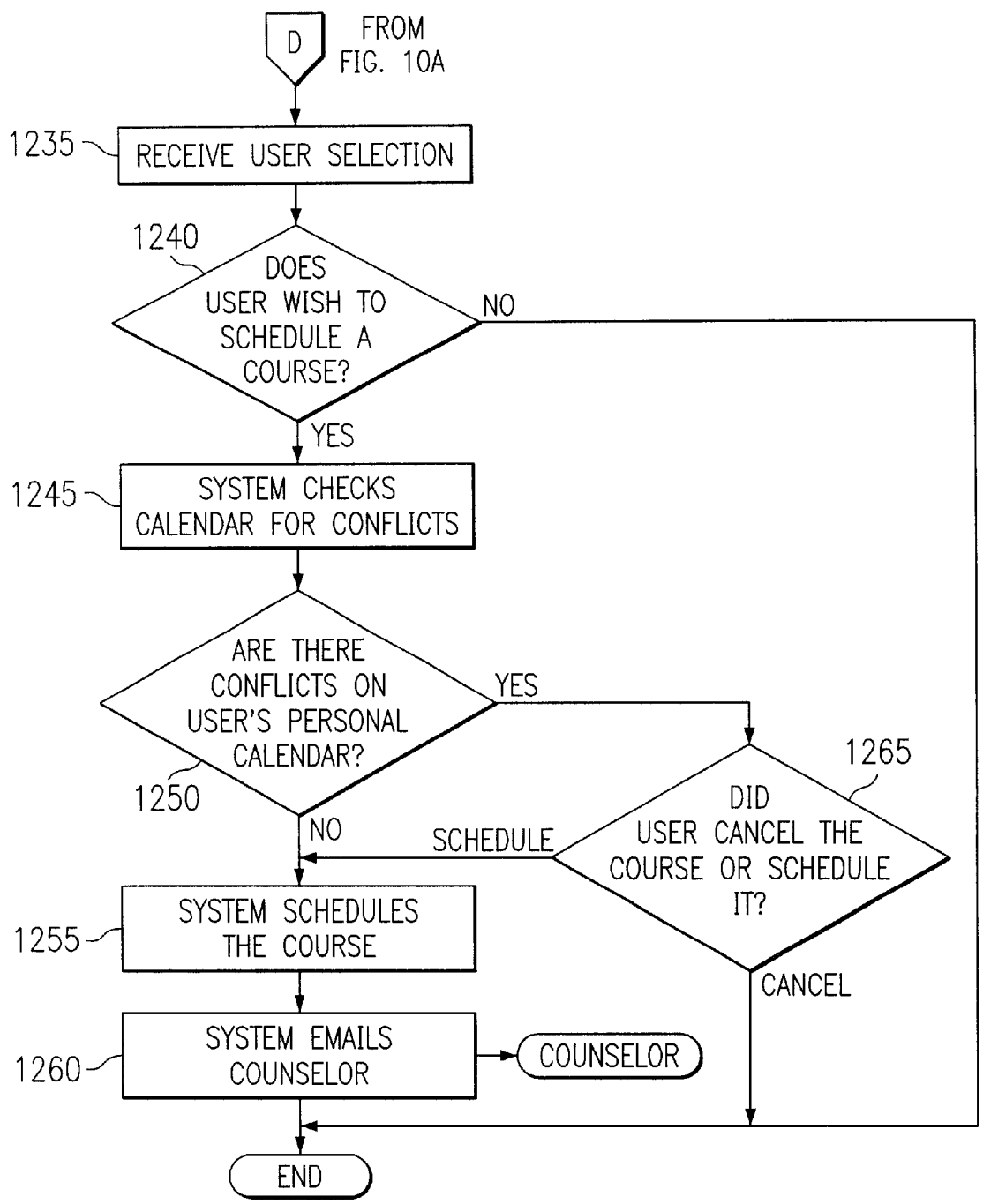
FIG. 10B is a flow diagram describing scheduling courses.

Referring now to FIG. 10, there is illustrated a flow diagram describing the building of curricula. Responsive to a user selection of an object for scheduling courses, a selection from a counselor is received which selects a particular participant (step 1005). At step 1010, the counselor's selection of an object for building curricula is received. Responsive thereto, the curricula and relevant courses information are retrieved from the database 221 (step 1015). At step 1020, a selection is received from the counselor and a determination is made whether the selection indicates that the counselor has completed building the curricula (step 1025). Wherein the counselor indicates that they have finished building the criteria, the process is terminated.

Wherein the counselor has not finished building the curricula during step 1025, a determination is made whether the counselor has indicated that they wish to delete the curricula during step 1020 (step 1030). In one embodiment, wherein the counselor has indicated that they wish to delete the curricula, a determination is made whether the course associated with the curricula has started or not (step 1035). Wherein the course has started, the deletion is rejected (step 1040). Wherein the course has not started, the counselor is asked whether they are sure about the deletion (step 1045) and indicate such (step 1050) before deleting the curricula (step 1055). Wherein the counselor does not wish to delete curricular during step 1030, steps 1035–1055 are bypassed.

Referring now to FIG. 11, at step 1105, a determination is made whether the counselor wishes to change the curricula (from the selection made during step 820). Wherein the counselor wishes to change the curricula, the curricula is retrieved from the database 221 (step 1110).

Wherein the counselor does not wish to change the curricula during step 1105, a determination is made whether the counselor wishes to add a curricula (step 1115). Wherein the counselor does wish to add a curricula, the system builds a new curricula (step 1120). Wherein the user does not wish to add a curricula during step 1115, the process of changing curricula is completed.

The course additions, deletions are received (step 1125) as well as the priority arrangements (step 1130) from the counselor and saved (step 1135). During step 1140, an email message is sent to the participant. Steps 1020–1140 are then repeated until an indication that the counselor has finished making course changes is received during step 1025.

Referring now to FIG. 11A, there is illustrated an alternative embodiment of the build curricula process. At step 1150, a selection by a training manager is received indicating a command to build a learning plan. At step 1155, a selection of courses for addition to a generic learning plan is received. At step 1160, an assignment of a generic learning plan users and varied due dates for each user is received. At step 1165, selection of courses pertinent to specific career choices is received from the training manager and assigned targeted career learning plans to users with selected career choices is received from the training manager (step 1170).

Figure 12:
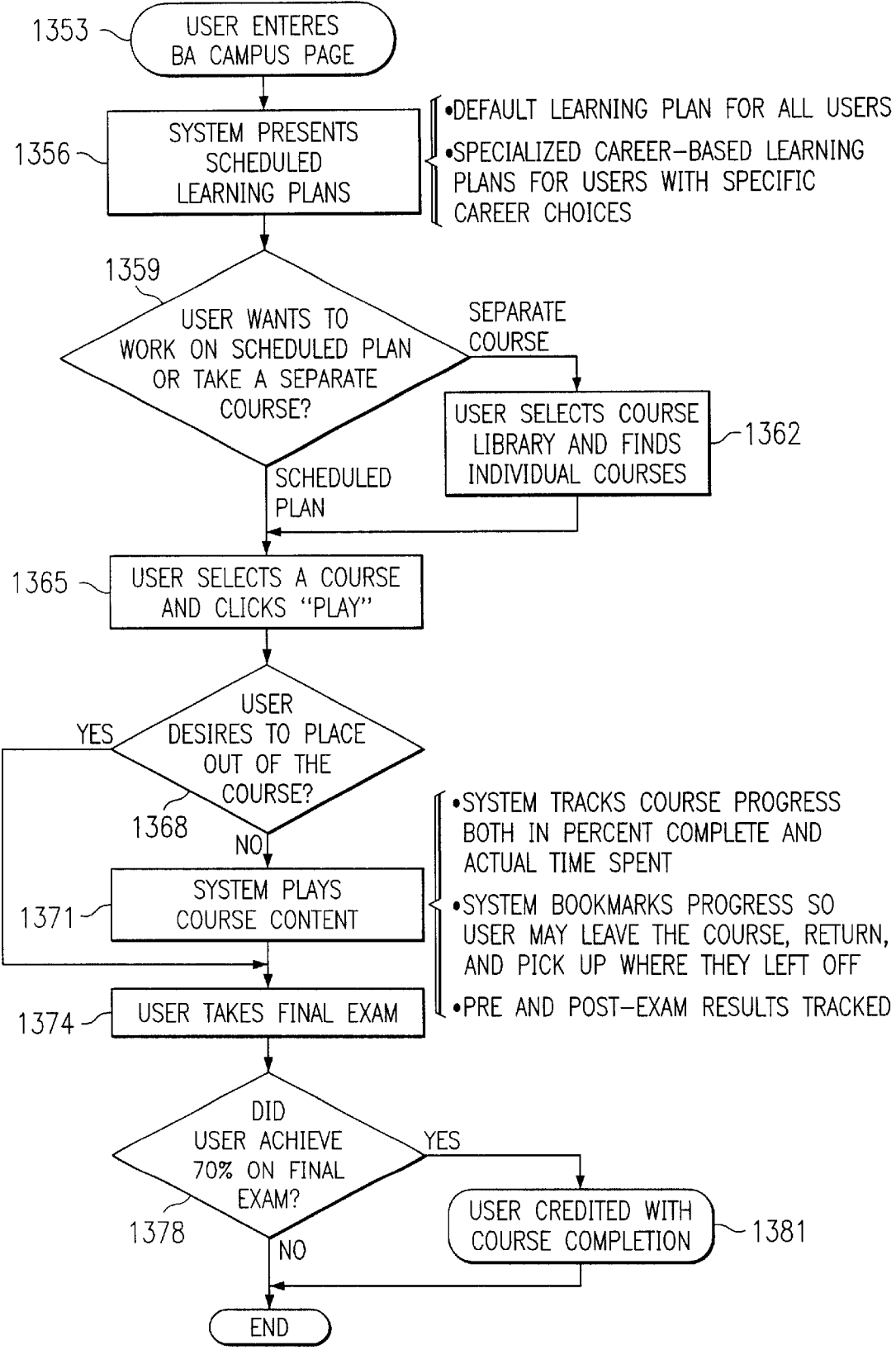
FIG. 12 is a flow diagram describing taking courses.

Referring now to FIG. 12, there is illustrated a flow diagram describing scheduling of courses. Responsive to a user selection for scheduling courses, a course categories list is presented (step 1205). At step 1210, a user selection of a particular course category is received and courses which match the user's selection are searched for in the database 221 (step 1215). During step 1220, a list of courses which pertain to the category selected by the user is presented and is sorted in as the user indicates (step 1225). At step 1230, the user is prompted to schedule a course.

At step 1235, a selection is received and a determination is made from the selection whether the user wishes to schedule a course (step 1240) and the process proceeds to step 1255. However, in one embodiment, at step 1245, the calendar is checked for conflicts and a determination is made whether any conflict exists (step 1250). Wherein no conflict exists, the course is schedule in the person calendar and the database 221 (step 1255) and the counselor is emailed (step 1260). Wherein a conflict exists, the user can either cancel or schedule the course, notwithstanding the conflict (step 1265). Wherein the user wishes to schedule the course, the course is scheduled (step 1255), the counselor is emailed (step 1260), and the course appears on the user's learning plan. Wherein the user cancels the course, steps 1255 and 1260 are bypassed.

Referring now to FIG. 13, there is illustrated a flow diagram describing how a user can take a course. Responsive to a user sign in, a selection to open a curricula is received (step 1305) with a course selection (step 1310). At step 1315, a determination is made whether the course is self-paced computer based training (CBT). Wherein the course is not a self-paced CBT, the user is informed (step 1320) of when to take the course and the process is complete. Wherein the course is self-paced, a determination is made whether the user has already started the course (step 1325). Wherein the user has not started the course, a pre-entrance exam is administered (step 1330) and the course is started (step 1335). Wherein the user has already started the course, the course is resumed at the point which the user left off (step 1340). At step 1345, a logoff selection is received from the user. Responsive thereto, a record is stored in the database 221 indicating the place during the course where the user left off (step 1350).

Referring now to FIG. 13A, there is illustrated a second of a process for taking courses, responsive to user entry of campus page (step 1353). At step 1356, a learning plan is presented and the user is prompted to select whether they wish to work on the scheduled learning plan or take a separate course (step 1359). Wherein the user selects to take a separated course during step 1359, individual course selections from a course library are received (step 1362).

Wherein user selects to work on the scheduled learning plan during step 1359, step 1362 is bypassed.

At step 1365, selection of a course and a course play selection are received. Responsive thereto, the user is prompted to select whether they wish to take the course or attempt to place out of the course (step 1368). Wherein the user selects to take the course (step 1371), the course content is played. Wherein the user selects to place out of the course during step 1368, step 1371 is bypassed. At step 1374, a final examination is administered and evaluated to determine if the user achieved a passing score, e.g., 70%, (step 1378). Wherein the user achieved the passing score, the user is credited with completing the course (step 1381) and the process is terminated. Wherein the user does not achieve the passing score, step 1381 is bypassed and the process is terminated.

Figure 14A:
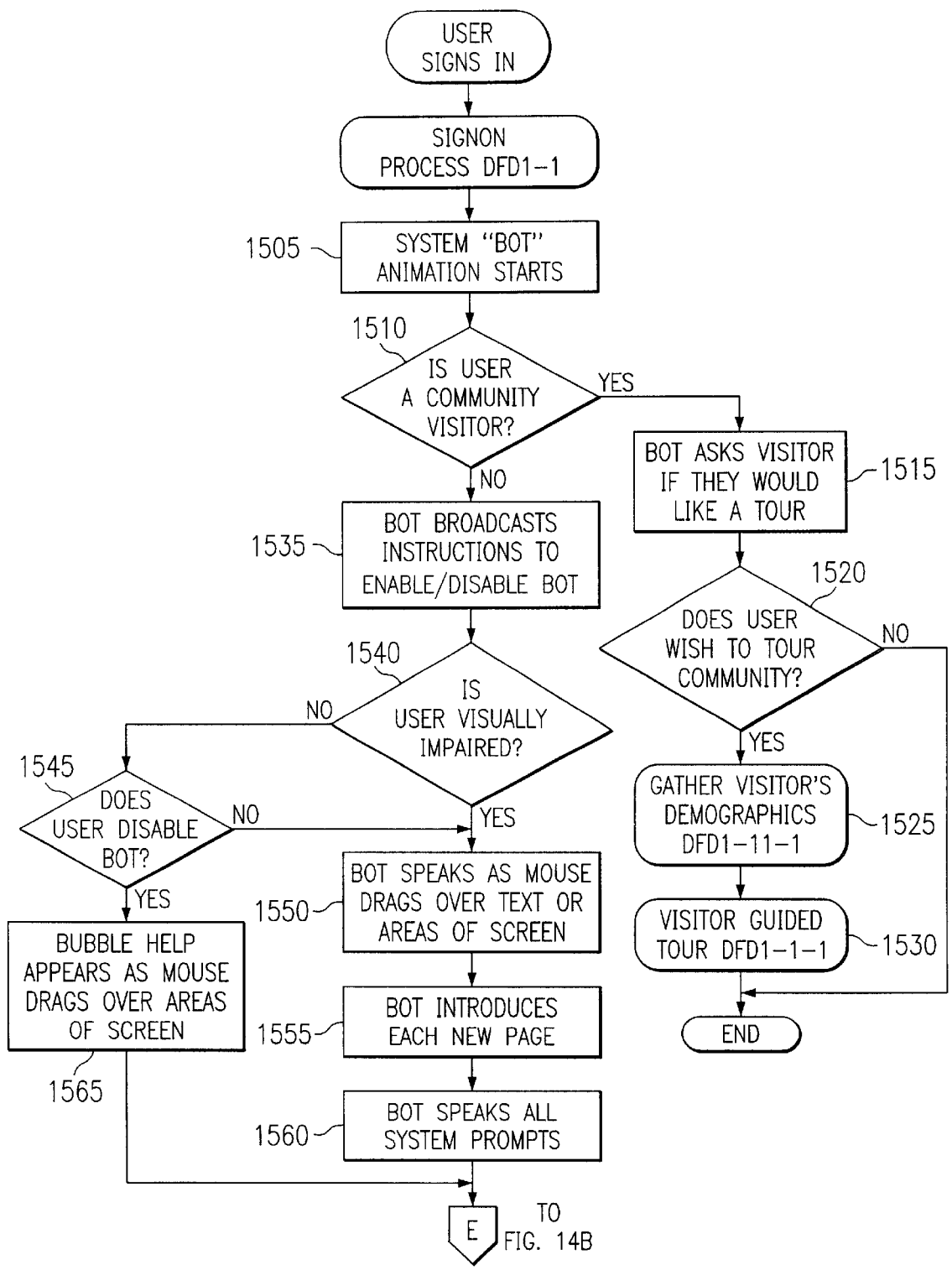
FIG. 14A is a flow diagram describing automated help.
Figure 14B:
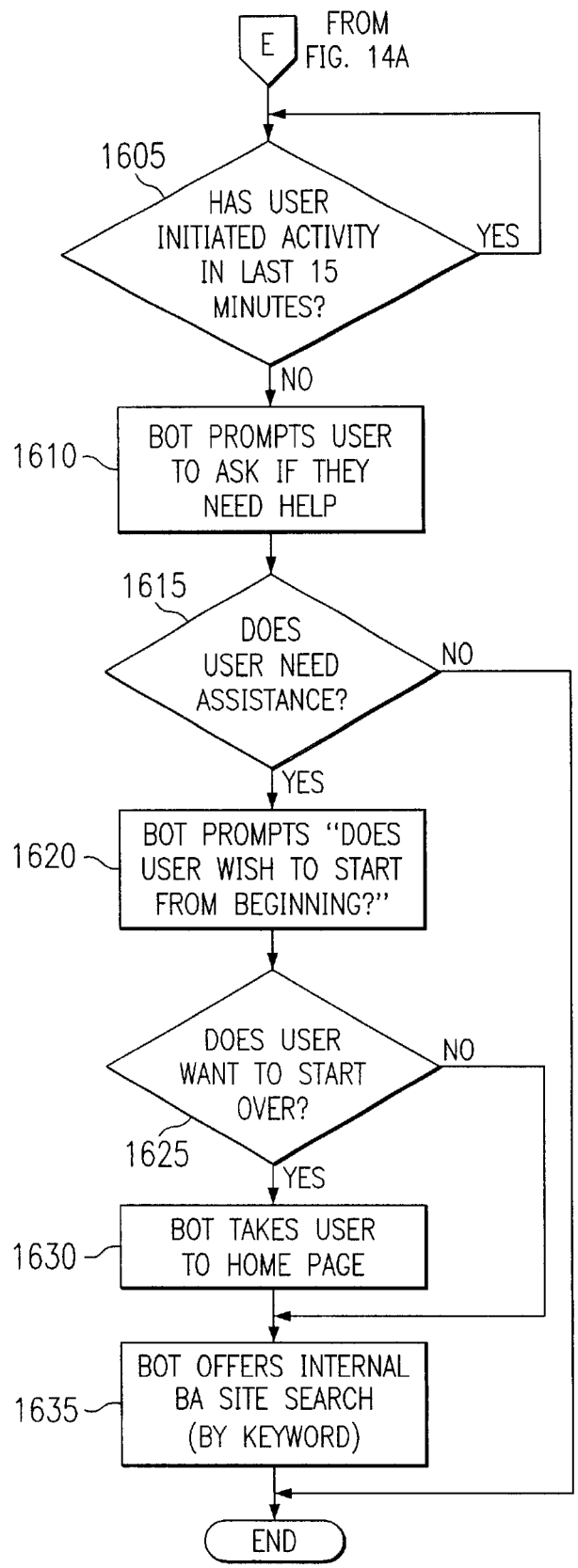
FIG. 14B is a flow diagram describing automated help.

Referring now to FIG. 14, there is illustrated a flow diagram describing the tracking of the usage of the system by a user. Responsive to the user signing in, the tracking mechanisms are initiated (step 1405). At step 1410, the date/time of the login is stored in the database 221. At step 1415, the internal site hits by the user are tracked and a determination of whether the user has left the predetermined proxy server web site is made during step 1420. Wherein the user has left the web site associated with the predetermined proxy server, time is credited for the first external web site visited in the database 221 (step 1425). At step 1430, the system records the exit time/date of the user.

Wherein the user remains within the web site associated with the proxy server, the system monitors whether there has been activity for the last 30 minutes, or alternatively, some other predetermined time interval (step 1440). Wherein the no activity has occurred during the predetermined time interval, the user is logged off (step 1445) and the time and date are recorded in the database 221 (step 1450).

Referring now to FIG. 15, there is illustrated a flow diagram describing automated help. After the user signs in, the system BOT animation starts (step 1505). A determination is made during step 1510 whether the user is a community visitor.

Wherein the user is a community visitor, the user is asked whether they would like a community tour (step 1515) and based on the user's response, a determination is made during step 1520 whether the user would like a tour. Wherein the user would like a tour during step 1520, demographic information about the user is gathered (step 1525) and the user is given a guided tour (step 1530). Wherein the user would not like a tour, steps 1525 and 1530 are bypassed.

Wherein the user is not a visitor, instructions are broadcast to enable/disable BOT (step 1535). A determination is made from the user's profile whether the user is visually impaired (step 1540). Wherein the user is not visually impaired, a determination is made whether the user disabled the BOT (step 1545).

Wherein either the user is visually impaired during step 1540 or the user has not disabled the BOT during step 1545, the BOT speaks as the mouse is dragged over text areas of the screen (step 1550), introduces each new page (step 1555), and speaks all system prompts (step 1560). Wherein the user is not visually impaired during step 1540 and has turned off the BOT during step 1545, visual text help, known as bubbles, appears as the mouse is dragged over areas of the screen (step 1565) and steps 1550–1560 are bypassed.

Referring now to FIG. 16, at step 1605, the activity of the user is monitored to determine whether the user has initiated activity within a predetermined time period, such as 15 minutes. Wherein the user has not initiated any activity during the predetermined time period, the BOT prompts the user (step 1610) to ask if they need help (step 1615).

Wherein the user needs help, the BOT prompts the user (step 1620) to determine whether the user wishes to start from the beginning (step 1625). Wherein the user wishes to start over during step 1625, the BOT takes the user to the home page (step 1630). Wherein the user does not wish to start over from the beginning step 1630 is bypassed. At step 1635, the BOT offers an internal site search by keyword.

Referring now to FIG. 16A, there is illustrated a flow diagram describing an alternate embodiment of the automated help feature. Responsive to the user signing in (step 1655), a determination is made whether the user is a visitor or not (step 1660).

Wherein the user is a community visitor, the user is asked whether they would like a community tour and based on the user's response, a determination is made during step 1661 whether the user would like a tour. Wherein the user would like a tour during step 1661, demographic information about the user is gathered (step 1662) and the user is given a guided tour (step 1663). Wherein the user would not like a tour, steps 1662 and 1663 are bypassed.

Wherein the user is not a community visitor during step 1660, the signon process, e.g., the process described in FIG. 4, occurs (step 1665). During step 1670, selection of a BOT by the user is received. At step 1675, the BOT speaks and describes the page the user is on. At step 1680, the user is prompted to indicate whether they need additional help. Wherein the user indicates that they need additional help during step 1680, a selection requesting help is received and detailed help text is presented (step 1685). During step 1690, a selection requesting reading of selected text is received and the BOT reads the selected text and the process is terminated. Wherein the user indicates that they do not need additional help during step 1680, steps 1685 and 1690 are bypassed and the process is terminated.

Although the invention has been described with a certain degree of particularity, it should be recognized that elements thereof may be altered by person skilled in the art without departing from the spirit and scope of the invention. One of the embodiments of the invention can be implemented as sets of instructions resident in computer readable memory for execution by a computer system. One skilled in the art would appreciated that the physical storage of the sets of instructions physically changes the medium upon which it is stored electrically, magnetically, or chemically so that the medium carries computer readable information. The invention is limited only by the following claims and their equivalents.

What is claimed is:

1. A method for teaching participants how to use a computer installed in each of the participant's residences, responsive to attending an orientation session, said method comprising:

signing a participant on to a predetermined web site;

receiving demographic data from the participant;

selecting a plurality of on-line course selections from a curriculum based on the participants' demographic data;

displaying the plurality of on-line course selections for the participant;

receiving a selection of at least one of the plurality of on-line courses;

storing at least one time in a calendar associated with the at least one on-line course;

scheduling the participant for the at least one on-line course;

conducting the at least one on-line course; and administering a final exam associated with the at least one on-line course.

2. The method of claim 1, wherein the demographic data comprises data selected from the group consisting participants goals, career choices, participant interests, hobbies, family data, disability data, and education data.

3. The method of claim 1, wherein scheduling the participant for the at least one course further comprises checking the calendar for conflicts with other times.

4. The method of claim 1, further comprising:

tracking the participant's time spent in each of the at least one on-line course.

5. The method of claim 1, further comprising:

determining whether the participant requires translation; and translating an electronic message from a server to the participant.

6. The method of claim 1, further comprising:

determining if the participant is visually impaired; and transmitting audible signals corresponding to an electronic message from the server to the participant.

7. The method of claim 1, wherein the installation of the computer is free to the participant.

8. The method of claim 1, further comprising:

providing automated help to the participant, responsive to a request from the participant.

9. The method of claim 1, further comprising:

presenting another plurality of on-line courses to the participant after administering the final exam, wherein the another plurality of on-line courses are selected based on the participants goals and career interests, and wherein the another plurality of on-line courses excludes the at least one on-line course.

10. The method of claim 1, further comprising:

evaluating the final exam;

determining whether the user passed the final exam; and wherein the user passed the final exam, crediting the user for the at least one on-line course.

11. A system operable to provide computerized training materials to a client computer, the system comprising:

a network interface operable to connect to a network of client computers;

a database comprising a computer memory portion operable to store participant information and curriculum information;

a server electrically connected to the network interface and the database, wherein the server is operable to provide a graphic user interface to a client computer, wherein the server comprises a computer memory encoded with instruction for performing the following:

signing a participant on to a predetermined web site through a client computer;

receiving demographic data from the participant;

storing the demographic data in a portion of the database corresponding to the participant;

selecting a plurality of on-line course selections from the curriculum based on the participant's demographic data;

displaying the plurality of on-line course selections for the participant;

receiving a selection of at least one of the plurality of on-line courses;

storing at least one time in a portion of the database corresponding to the participant's calendar, wherein the at least one time corresponds to the selected course(s);

scheduling the participant for the at least one on-line course;

conducting the at least one on-line course; and administering a final exam associated with the at least one on-line course.

12. A system according to claim 11, wherein the computer memory encoded with instructions for scheduling the participant further comprises instructions for comparing the schedule for the at least one on-line course with the participant's schedule to determine if a conflict exists.

13. A system according to claim 11, wherein the computer memory in the server is further encoded with instructions for tracking the participant's time spent in each of the at least one on-line course.

14. A system according to claim 11, wherein the server further comprises a translator for translating electronic messages from the server into another language, wherein the translator comprises a computer memory encoded with instructions for determining whether the participant requires a translation and instructions for translating an electronic messages from the server to the participant.

15. A system according to claim 11, wherein the server further comprises a transcriber for transcribing electronic messages from the server into audio messages, wherein the transcriber comprises a computer memory encoded with instructions for:

determining if the participant is visually impaired; and transmitting audible signals corresponding to an electronic message from the server to the participant.

16. The system according to claim 11, wherein the client computer is provided and installed at the participant's home at no cost to the participant.

17. The system according to claim 11, wherein the computer memory in the server is further encoded with instructions for providing automated help to the participant, responsive to a request from the participant.

18. The system according to claim 11, wherein the computer memory in the server is further encoded with instructions for presenting another plurality of on-line courses to the participant after administering the final exam, wherein the another plurality of on-line courses are selected based on the participants goals and career interests, and wherein the another plurality of on-line courses excludes the at least one on-line course.

19. The system according to claim 11, wherein the computer memory in the server is further encoded with instructions for:

evaluating the final exam;

determining whether the user passed the final exam; and wherein the user passed the final exam, crediting the user for the at least one on-line course.

* * * * *